United States Patent [19]

Smith

[11] 3,771,257
[45] Nov. 13, 1973

[54] TYING MACHINE
[75] Inventor: Berny L. Smith, Valrico, Fla.
[73] Assignee: Transcinor Incorporated, Miami, Fla.
[22] Filed: Sept. 21, 1971
[21] Appl. No.: 182,434

[52] U.S. Cl. .................................................. 47/1
[51] Int. Cl. ............................................ A01g 17/08
[58] Field of Search ...................... 47/1, 44, 46, 47; 56/405, 425, 426–427; 289/18

[56] References Cited
UNITED STATES PATENTS

| 759,401 | 5/1904 | Simmonds | 56/426 |
|---|---|---|---|
| 767,457 | 8/1904 | Webster | 56/426 |
| 1,553,706 | 9/1925 | Meink | 56/405 |
| 2,753,661 | 7/1956 | Wiemers | 47/1 |
| 3,034,259 | 5/1962 | Herr | 47/1 |
| 3,015,187 | 2/1962 | Grether | 47/1 |
| 3,201,085 | 8/1965 | Maley | 254/64 |

FOREIGN PATENTS OR APPLICATIONS

| 202,639 | 11/1962 | U.S.S.R. | 47/1 |
| 206,938 | 12/1967 | U.S.S.R. | 47/1 |

Primary Examiner—Robert E. Bagwill
Attorney—Stein & Orman

[57]  ABSTRACT

A vehicle having a supporting frame on which is mounted one or more tying assemblies designed to direct cord means in the form of string, cord, or the like in cooperative, supporting engagement about successively positioned stakes and plants arranged in alternate spaced relation to these stakes. Each tying assembly comprises a first and second hydraulic cylinder arrangement operatively connected to one another so as to be successively activated and thereby move a cord directing tube in a desired pattern in order to position the cord in supporting relation about the stake and plant as desired.

8 Claims, 7 Drawing Figures

INVENTOR.
BERNY L. SMITH
BY *Law Offices of Stein & Orman*
ATTORNEYS.

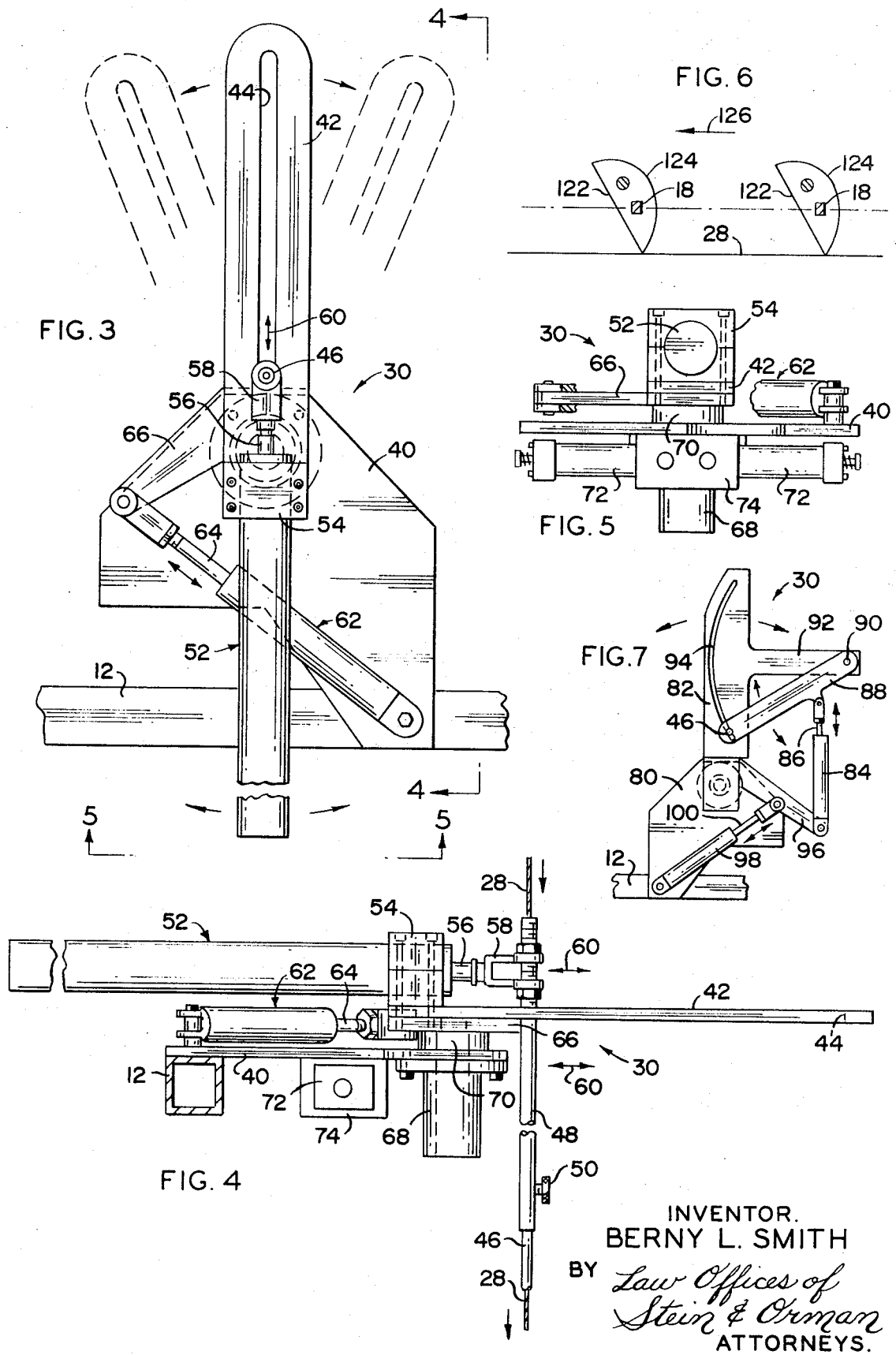

TYING MACHINE

BACKGROUND OF THE INVENTION

1. Field of the Invention

A mobile machine capable of supporting one or more cord directing assemblies which are hydraulically operated by means of hydraulic cylinder means which serve to move a cord directing tube or channel relative to specifically located and successively arranged plants such that the cord is placed in supporting relation to and aids the growth of the plant.

2. Description of the Prior Art

In the farming and agriculture industry it is well known that for the most efficient growth of certain plants, the entire above ground portion of the plant must be exposed to as much sunlight as possible. However, certain type plants such as tomatoes or the like are substantially vine-like wherein if the plant is not properly supported, it will grow along the ground. This has the effect of depriving major portions of the plant and the blossoming fruit, such as tomatoes, from necessary amounts of sunlight. This of course hampers the growth of the plant and directly affects the production of a plant both in quantity and size of fruit being produced. This of course has a direct bearing on the crop yield of a given amount of acreage. It can readily be seen therefore, that supplying proper amounts of sunlight to the major portions of a plant is a specific and ever present problem in the agriculture industry.

In attempting to overcome this problem in the growing of tomato plants and like produce, it is common practice to provide a plurality of support stakes in spaced, substantially linear relation to one another and positioned alternately between the plants themselves which define a row. While the stakes themselves are not intended to directly support the individual plants, they are designed to have one or more cords or strings fastened thereto such that the cord is strung along an entire row of stakes and thereby positioned in supporting relation to the plants arranged between the stakes. By virtue of the presence of these cords being strung between the supporting stake the plants will have a tendency to grow upwardly since they will be supported by the cords, rather than horizontally along the ground.

Since the necessity of these cords being placed in supporting relation to the plant is obvious in order to insure a productive crop, care should be taken in the proper positioning of the cord. In addition, it has been found necessary to provide a plurality of sets of cords at different heights relative to the ground to properly support the plant during its various stages of growth. It is common practice to supply at least three levels of cords in supporting relation to a plant from the time it is planted until harvesting. In dealing with large amounts of acreage it can be readily seen that such supporting cords must be applied to literally thousands of plants. This is of course very time consuming and expensive to a particular farmer. In the past many attempts have been made to reduce the time and cost involved in positioning these cords and to facilitate the accurate placement of the cords relative to a growing plant. It is obvious that when dealing with large amounts of acreage manual tying of these cords in supporting relation to the plants is extremely time consuming and accordingly expensive. In addition, manual application is also irregular and unreliable.

A move towards automation and the use of more mechanized farm equipment has caused the development of various devices for applying these cords to the plants in supporting relation thereto. However, because of the many variables involved when dealing with agricultural products including size of individual plants, relative location of the plant in a given row and the spacing between the individual plants, these prior art tying machines have included relatively sophisticated and complex structures. These more complex structures obviously are more expensive to purchase and to maintain and in addition leave much to be desired in the accurate positioning of the cords relative to the plants.

Based on the above it can be readily seen that there is a need in the agriculture industry for a tying machine of simple design and construction which efficiently and accurately positions supporting cord relative to various type plants in order to facilitate their growth and production.

SUMMARY OF THE INVENTION

This invention relates to a tying machine of relatively simple construction and accordingly low cost capable of rapidly and accurately positioning one or more cord means, in the form of a cord or string, in supporting relation to plants so as to aid their growth in a desired vertical direction, thereby exposing the major portion of the plant to sufficient sunlight.

More particularly, the machine includes a mobile, vehicle frame supported by a plurality of wheels and powered by a conventional internal combustion engine or the like. The frame is configured so as to be capable of travel in a co-linear direction to a row of plants, such that the frame essentially straddles at least one row of plants during its foward movement.

One or more tying assembles are mounted on the frame and positioned in cooperative relation to the row or rows of plants traveling directly underneath the frame. When a plurality of tying assemblies are mounted on the same frame they are positioned in spaced opposed relation such that a cord is directed through each assembly around each of the successively arranged stakes and in supporting relation to each of the successively arranged plates positioned in interspaced relation to each of the stakes.

One embodiment of the tying assembly comprises a base plate fixedly secured to the vehicle frame and having a positioning means including a hydraulic cylinder arrangement movably mounted thereon. This hydraulic cylinder arrangement is interconnected between the base plate and a link arm which is fixedly attached to a guide means in the form of a guide arm. This guide arm is also movably mounted on the base plate so that upon activation of this guide arm positioning means the guide arm will rotate relative to the base plate. An additional positioning means also including a hydraulic cylinder arrangement is fixedly attached to one end of the guide arm and is also connected to a cord directing means. This directing means is in the form of an elongated hollow tube and serves to direct or channel the cord being tied about the plant in a supporting relation about the stakes. This tube is connected to the hydraulic cylinder arrangement associated with the guide arm so as to be moved in a linear direction within an elongated slot formed in the guide arm.

Another embodiment of the present invention relates to a tying assembly having a somewhat different structure than the first embodiment described above. More specifically, a first positioning means includes a hydraulic cylinder which, instead of being attached directly to the guide arm, as described above, is movably interconnected between a pair of link arms which form a part of the first and second positioning means respectively. The first link arm has the cord directing means in the form of an elongated tube mounted on one extremity thereof such that when the link arm is moved the tube travels in a somewhat arcuate shaped slot formed in the guide arm. The opposite end of this first link arm is pivotally attached to an extension integrally formed on the guide arm. The second link arm is fixedly attached to one extremity of the guide arm such that movement of the second positioning means causes rotation of the entire first positioning means and the guide arm attached thereto.

Regardless of which embodiment of the tying assembly is utilized, a control assembly is used in combination with each of the tying assemblies mounted on the vehicle frame. More specifically, the control assembly comprises a pair of angularly oriented, outwardly extending fingers arranged in horizontally spaced relation to one another and mounted so as to be movable in a transverse direction relative to the longitudinal axis of the frame of the vehicle. The control assembly comprises switching means including two switches which may be of the time delay type for the reasons to be hereinafter explained. Each of the switches is operatively connected by conventional electrical connection means, to one of the two positioning means. The switches are arranged relative to one another in a vertically spaced relation such that one of the switches is designed to contact the stake as it passes beneath the vehicle while the other one is designed to contact the cord directing means or elongated tube which is part of the tying assembly with which the particular control assembly is cooperating.

In operation, the vehicle is aligned with at least one row of alternating stakes and plants such that this row passes immediately beneath the frame in general alignment with the control assemblies mounted on the frame of the vehicle. The control assemblies as well as the tying assemblies are mounted in a somewhat tandem relation such that each stake passing beneath the vehicle engages each of the control assemblies and receives cord from each of the tying assemblies. As a particular stake passes through the two fingers of the control assembly the control assembly is moved transversely to the longitudinal axis of the frame and is thereby centered over this stake. The stake trips a first, lowermost switch which activates the first positioning means by extending the hydraulic cylinder arrangement so as to position the cord directing tube in its outermost position. As this tube is traveling to its outermost position relative to the guide arm it trips the second, uppermost switch which serves to activate the second positioning means and more particularly the hydraulic cylinder arrangement associated therewith. Since the cylinder associated with the second positioning means is already in its extended position, when the first positioning means was activated, the second positioning means is retracted which serves to move the guide arm, and directing tube in a somewhat arcuate path relative to the stake. Upon completion of the tube traveling in this predetermined pattern, each hydraulic cylinder arrangement associated with the first and second positioning means is automatically retracted and extended respectively. This places the assembly in its original ready position until a second stake activates the switch means associated with this tying assembly.

One important feature of the central assembly is the particular, relative locations of the two switches and their cooperation with the respective tying assemblies. More specifically, the location of the two switches defines the exact coordinates of a stake passing through the control assembly. This is accomplished since the secured positioning means is actuated only after the cord directing tube is properly positioned relative to the stake which activated the first positioning means. The exact position of the stake is difficult in prior art machines since the stakes are of course not exactly aligned in a linear relation to each other and the row of plants. To insure accuracy in locating the stakes relative to each tying assembly and in positioning the cords relative thereto, the entire control assembly is movably mounted so as to be automatically centered over a stake passing therethrough.

BRIEF DESCRIPTION OF THE DRAWINGS

For a fuller understanding of the nature and objects of the invention, reference should be had to the following detailed description taken in connection with the accompanying drawings in which:

FIG. 3 is a detailed view of one embodiment of the tying assembly showing the positions of the guide arms in broken lines.

FIG. 4 is a side view taken along line 4—4 of FIG. 3.

FIG. 5 is an end view taken along lines 5—5 of FIG. 3.

FIG. 6 is a schematic showing the patterns which the cord directing means follows upon activation of the tying assembly.

FIG. 7 is a detailed view of another embodiment of the tying assembly.

Similar reference characters refer to similar parts throughout the several views of the drawings.

DETAILED DESCRIPTION

Figure 1:
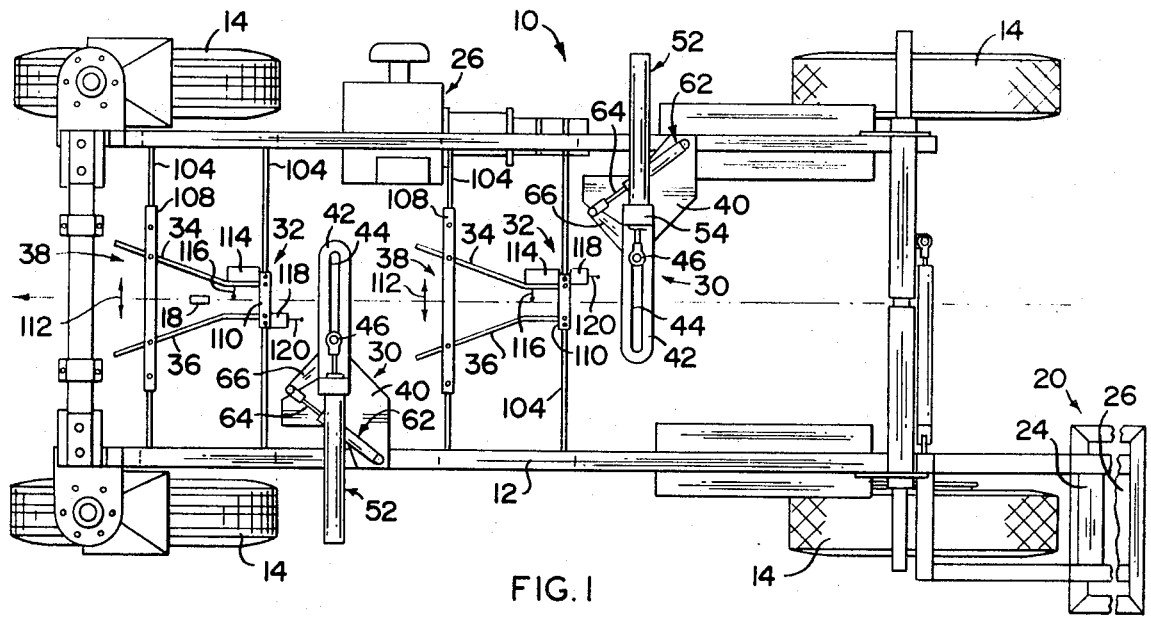
FIG. 1 is a top plane view showing the tying machine vehicle with the tying assemblies and control assemblies mounted thereon.

As shown in FIG. 1 the present invention relates to a tying machine comprising a machine vehicle generally indicated at 10 and including a substantially rectangular frame 12 movably supported relative to the ground by conventional tractor tires or the like 14. The frame is designed to straddle, and move relative to, a row of plants 16 interspaced between successively arranged supporting stakes 18. The vehicle 10 is operated from the operator area 20 including a control panel 22 and seat 24 in which the operator of the vehicle rides. The machine vehicle is powered by any type conventional internal combustion engine 26 or like power source capable of powering the vehicle to move at the desired speed and in the desired direction.

Figure 2:
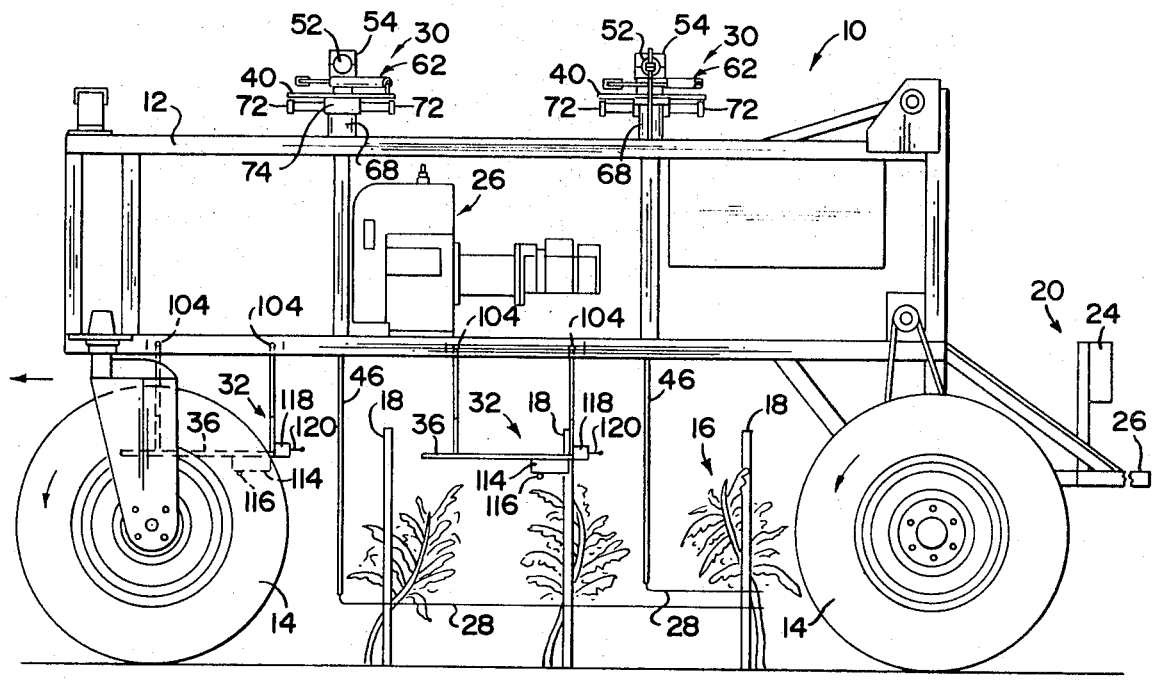
FIG. 2 is a side view of FIG. 1.

As mentioned above this machine is designed to affix cord means in the form of cord, string, wire or the like in supporting relation to a row of successively arranged plants 16 such as tomato plants. To accomplish this the cord 28 is continuously fed from a supply (not shown)

onto a stake 18 in supporting relation to plant 16. The proper positioning of the cord 28 relative to the stakes and plant is accomplished by means of one or more tying assemblies generally indicated at 30. If a plurality of tying assemblies are mounted on the same frame, they are ideally arranged in horizontally spaced, substantially tandem arrangement in opposed position relative to one another as shown in FIG. 1. By virtue of this arrangement a cord 28 is directed through each of the assemblies onto each of the successively positioned stakes and plants as shown in FIG. 2. A control assembly generally indicated at 32 is mounted on frame 12 in working relation to each of the tying assemblies 30. This control assembly has the capability of moving transversely to the longitudinal axis of frame 12 and accordingly is automatically positioned on any given stake passing through guide fingers 34 and 36 defining the guide channel 38. The particular structural details of the control assembly will be described hereinafter.

FIGS. 3, 4 and 5 are directed to one embodiment of the tying assembly of the present invention which includes base plate 40 secured to frame 12 in any desirable fashion. A guide means in the form of guide arm 42 is rotatably mounted on plate 40 and includes an elongated slot 44 extending substantially the entire length of guide arm 42 as shown in FIG. 3. Cord directing means 46 is in the form of an elongated hollow tube which directs cord 28 from a source (not shown) onto the successively arranged plants and stakes 16 and 18 (FIG. 2). Means to adjust the height of the exiting extremity of each tube is provided in the form of sleeve 48 having tube fastening means 50 which may be a conventional threaded bolt. It is important that the delivery end of tube 46 be adjustable to a variety of heights from the ground dependent upon the height, or stage of growth of the plant being supported.

A first positioning means is included in the tying assembly and comprises a hydraulic cylinder arrangment generally indicated at 52. The cylinder is fixedly attached to the inner extremity of guide arm 42 by means of a connecting block 54 (FIGS. 4 and 5). The cylinder is positioned relative to the guide arm such that the free extremity of the rod 56 associated with the cylinder arrangement 52 is securely attached to tube adjusting means 48 by means of U-shaped bracket 58 threadedly engaging the upper extremity of sleeve 48. As can be readily seen, activation of hydraulic cylinder arrangement 52 causes the movement of rod 56 and accordingly tube 46 in an extended or retracted direction as indicated by directional arrows 60.

A second positioning means including hydraulic cylinder arrangement 62 is movably interconnected between base plate 40 and guide arm 46. More specifically, the hydraulic cylinder arrangement 62 includes a piston rod 64 associated therewith having its free end movably connected to link arm 66 which itself is fixedly attached to guide arm 42. As mentioned above, the guide arm 42 is movably mounted on base plate 40 and this is accomplished by the cooperative arrangement between bushing 68 and spacer 70.

As shown in FIG. 5 fluid is supplied to the hydraulic cylinder arrangements 52 and 62 from a source 72 through any conventional distribution chamber 74, which may be attached to the underside of base plate 40.

Referring to FIG. 7 another embodiment of the tying assembly comprises base plate 80 attached to frame 12 and including guide arm 82 movably mounted thereon in a manner similar to that described above with reference to FIGS. 3-5. More particularly, a bushing 68 and spacer 70 similar to that described above are used in combination with the base plate 80 such that the guide arm 82 may be rotated relative to the base plate. The first positioning means in this embodiment comprises hydraulic cylinder arrangement 84 including piston rod 86 movably attached to link arm 88. This link arm is rotatably or pivotally mounted at 90 to extension 92 integrally formed onto guide arm 82. The opposite extremity of link arm 88 has the tube 46 and adjusting sleeve 48 arranged thereon similar to the previous embodiment shown in FIG. 4. Upon activation of hydraulic cylinder arrangement 84 the tube is forced to travel in an arcuate shaped slot 94 formed in the guide arm 82. A second link arm 96 is movably connected to the opposite end of cylinder arrangement 84 and fixedly connected to the inner extremity of guide arm 82. In addition, this link arm is movably attached to the second positioning means comprising a hydraulic cylinder arrangement 98. More specifically, piston rod 100 associated with cylinder 98 is movably connected to link arm 96 such that activation of cylinder 98 causes the entire first positioning means and guide arm 84 and 82 respectively, to be rotated relative to base plate 80. A cylinder fluid supply and distribution chamber of the type described in FIG. 5 with reference to the first embodiment of the tying assembly may be mounted on the undersurface of base plate 80 so as to supply hydraulic cylinder arrangement 84 and 98 of this embodiment.

Regardless of the specific embodiment of the tying assembly utilized, each tying assembly is associated with a control assembly shown in FIG. 1, which includes switching means mounted thereon serving to successively activate the first and second positioning means in accordance with the particular location of the stake passing relative to the control assembly. More specifically each control assembly associated with each tying assembly is generally indicated at 32 in FIG. 1 and comprises a pair of mounting shafts 104 extending between the longitudinal legs of the frame 12 in transverse relation to the longitudinal axis thereof. Guide fingers 34 and 36 are arranged in spaced horizontal relation to one another and are angularly oriented to form a guiding channel 38 having a substantially Y-shaped configuration. These fingers 34 and 36 are movably connected to shafts 104 by means of sleeves 108 and 110 arranged to slidingly engage the shafts 104 as shown by directional arrow 112. Switch means in the form of a lowermost switch 114 having trip finger 116 and an uppermost switch 118 having trip finger 120 are mounted in vertically spaced relation at the back of the guiding channel defined by fingers 34 and 36 on sleeve 110. Switches 114 and 118 serve to activate the first and second positioning means respectively and more particularly the hydraulic cylinder arrangement associated with each of these positioning means.

In operation, the vehicle 10 travels along one or more rows defined by alternately arranged plants and supporting stakes 16 and 18 respectively. As a given stake passes through the first control assembly 102 it engages level 116 of switch 114 which is arranged in a transverse relation to the longitudinal axis of the frame. The tripping of this switch activates the hydraulic cylinder arrangement associated with the first positioning means of the tying assembly, irrespective of which embodiment is utilized. This serves to move cord directing tube 48 to the outer most extremity of slot in the associated guide arm. This path is indicated by line 122 of the schematic diagram in FIG. 6. During this extended travel the tube engages trip element 120 of the uppermost switch 118. Upon activation of this switch, the hydraulic cylinder arrangement associated with the second positioning means is activated by retracting its respective piston rod into the cylinder. This has the effect of pivoting the guide arm, and accordingly the directing tube, while in its outermost position, in an arcuate type path represented by curve line 124 in FIG. 6. Upon completion of this arcuate path both the first and second positioning means and more particularly the hydraulic cylinder arrangements associated therewith assume a retracted and extended position representing their "ready" position waiting to cooperate with the next successive stake. The schematic pattern of FIG. 6 are considered with reference to the vehicle moving in a forward direction indicated by arrow 126. When a plurality of tying assemblies are used each stake passes through the control assembly and accordingly cooperates with each of the tying assemblies on the frame. Therefore, each stake has tied thereon the number of cords corresponding to the number of tying assemblies mounted on the frame.

It will thus be seen that the objects made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also understood that the following claims are intended to cover all of the generic and specific features of the invention herein described, and all statements of the scope of the invention which, as a matter of language, might be said to fall therebetween.

Now that the invention has been described,
What Is Claimed Is:

1. A tying assembly mounted on a vehicle and designed to arrange plants in supported relation relative to a plurality of prearranged stakes by the use of cord means, said tying assembly comprising: a base plate for guiding the movement of cord directing means, said cord directing means movable in said guide means relative to said base plate and engaging the cord means, guide means connected to said base plate and extending therefrom, a first positioning means movably connected to said base plate and attached to the cord directing means so as to position it in said guide means; a second positioning means movably connected to said base plate and attached to said guide means for disposing said guide means and cord directing means in predetermined position relative to a stake, a control assembly mounted on the vehicle in the path of the stake, said control assembly including switch means operatively connected to said positioning means, whereby said first and second positioning means are sequentially activated upon engagement of said switch means with the stake thereby positioning cord directing means relative to the stake last contacting said switch means.

2. A tying assembly as in claim 1 wherein said second positioning means comprises a first hydraulic cylinder arrangement movably mounted on said base plate, a lever arm interconnected between said base plate and said first cylinder arrangement such that movement of said cylinder causes said guide means to be moved in a predetermined direction.

3. A tying assembly as in claim 1 wherein said first positioning means is mounted on said base plate and comprises a second hydraulic cylinder arrangement disposed thereon so as to move said cord directing means relative to said guide means.

4. A tying assembly as in claim 3 wherein said guide means comprises an elongated arm, said cord directing means connected to said second cylinder arrangement so as to move along the length of said guide arm when said second cylinder arrangement is activated.

5. A tying assembly as in claim 1 wherein said cord directing means comprises a tube mounted substantially perpendicular to said guide means, said tube disposed to travel substantially along the length of said guide means.

6. A tying assembly as in claim 1 wherein said control assembly includes at least two outwardly extending fingers, arranged in spaced relation to one another so as to find a guide channel through which the stakes pass during forward motion of the vehicle.

7. A tying assembly as in claim 6 wherein said switch means includes a first and second switch arranged in spaced relation to one another on said control assembly, said first switch adapted to engage said stake and said second switch adapted to engage said cord directing means successively, each switch operatively connected to at least one of said positioning means such that said positioning means are successively activated, whereby said cord directing means is caused to move in a predetermined pattern relative to these stakes.

8. A tying assembly as in claim 1 wherein there is mounted on said vehicle at least one additional tying assembly, a second control assembly means arranged in operative relation to said additional tying assembly, each of said tying assemblies arranged in tandem relation to one another whereby cord means from each assembly is secured to each of said successively arranged stakes.

* * * * *